(12) United States Patent
Kashiwagi et al.

(10) Patent No.: US 9,913,484 B2
(45) Date of Patent: Mar. 13, 2018

(54) PRODUCTION METHOD FOR CONCENTRATED PRODUCT USING MEMBRANE-CONCENTRATION METHOD AND FREEZE-CONCENTRATION METHOD

(71) Applicant: Meiji Co., Ltd., Koutou-ku, Tokyo (JP)

(72) Inventors: Kazunori Kashiwagi, Odawara (JP); Takefumi Ichimura, Odawara (JP); Yoshinori Satake, Odawara (JP); Tetsu Kamiya, Odawara (JP); Toshihiro Omori, Odawara (JP); Hiroki Matsubara, Odawara (JP)

(73) Assignee: MEIJI CO., LTD., Tokyo (JP)

( * ) Notice: Subject to any disclaimer, the term of this patent is extended or adjusted under 35 U.S.C. 154(b) by 0 days.

(21) Appl. No.: 14/915,328

(22) PCT Filed: Aug. 29, 2014

(86) PCT No.: PCT/JP2014/072713
§ 371 (c)(1),
(2) Date: Feb. 29, 2016

(87) PCT Pub. No.: WO2015/030162
PCT Pub. Date: Mar. 5, 2015

(65) Prior Publication Data
US 2016/0205959 A1      Jul. 21, 2016

(30) Foreign Application Priority Data

Aug. 29, 2013 (JP) ................................ 2013-178584

(51) Int. Cl.
*A23C 1/06* (2006.01)
*A23C 9/142* (2006.01)
(Continued)

(52) U.S. Cl.
CPC ............... *A23C 1/06* (2013.01); *A23C 9/142* (2013.01); *A23C 9/1427* (2013.01);
(Continued)

(58) Field of Classification Search
CPC ......... A23C 1/06; A23C 9/142; A23C 9/1427; B01D 9/04; B01D 9/0013; B01D 9/0036; B01D 9/1427; B01D 61/04; B01D 61/16
See application file for complete search history.

(56) References Cited

U.S. PATENT DOCUMENTS

| 4,316,368 A | 2/1982 | Van Pelt et al. |
| 4,374,865 A * | 2/1983 | Strobel ................ A23L 2/08 426/384 |

(Continued)

FOREIGN PATENT DOCUMENTS

| EP | 0137671 | * | 4/1985 |
| EP | 1574141 | * | 9/2005 |

(Continued)

OTHER PUBLICATIONS

English Trnalsation for JP 63007773 published Jan. 1988.*

(Continued)

*Primary Examiner* — Anthony Weier
(74) *Attorney, Agent, or Firm* — Buchanan Ingersoll & Rooney PC

(57) ABSTRACT

A method using a membrane-concentration method and a freeze-concentration method includes: a membrane-concentration step in which a fluid to be treated is cooled and a membrane-concentrated fluid is prepared by membrane-concentrating the solid content concentration thereof by more than 1.5 times; an ice crystal generation step in which said membrane-concentrated fluid is cooled, ice crystals of said membrane-concentrated fluid are generated in said membrane-concentrated fluid, and a mixed fluid to be (Continued)

treated is formed wherein said mixed fluid to be treated is comprised of said ice crystals and a concentrated fluid to be treated produced from said membrane-concentrated fluid by generating said ice crystals in said membrane-concentrated fluid thereby said membrane-concentrated fluid is concentrated; and an ice crystal separation step in which said mixed fluid is separated into said concentrated fluid to be treated and said ice crystals, and said separated concentrated fluid to be treated is retrieved.

6 Claims, 1 Drawing Sheet

(51) Int. Cl.
    *B01D 9/04*         (2006.01)
    *B01D 61/04*       (2006.01)
    *B01D 61/16*       (2006.01)
    *B01D 9/00*         (2006.01)

(52) U.S. Cl.
    CPC ......... *B01D 9/0013* (2013.01); *B01D 9/0036* (2013.01); *B01D 9/04* (2013.01); *B01D 61/04* (2013.01); *B01D 61/16* (2013.01)

(56) References Cited

U.S. PATENT DOCUMENTS

| | | | | |
|---|---|---|---|---|
| 4,959,234 A | * | 9/1990 | Ahmed | ............... A23C 1/06 426/384 |
| 2005/0050917 A1 | | 3/2005 | Kagitani et al. | |
| 2011/0135802 A1 | | 6/2011 | Robinson et al. | |
| 2012/0164298 A1 | | 6/2012 | Robinson et al. | |
| 2012/0164299 A1 | | 6/2012 | Robinson et al. | |

FOREIGN PATENT DOCUMENTS

| | | | |
|---|---|---|---|
| JP | 45-028544 B1 | | 9/1970 |
| JP | 55-159752 A | | 12/1980 |
| JP | S57-105202 A | | 6/1982 |
| JP | 63-007773 | * | 1/1988 |
| JP | 2000-334203 A | | 12/2000 |
| JP | 2001191071 | * | 7/2001 |
| JP | 2003-287325 A | | 10/2003 |
| JP | 2005-081215 A | | 3/2005 |
| JP | 2006-166880 A | | 6/2006 |
| JP | WO2012176719 | * | 2/2015 |
| WO | WO 2012/087585 A1 | | 6/2012 |
| WO | WO2012/176719 | * | 12/2012 |

OTHER PUBLICATIONS

English Translation fo JPWO2012176719 published 2-215 (which is an equivalent to WO2012/176719).*
English Translation for JP 2000-334203 published Dec. 2000.*
English Translation of JP 2003-287325 published Oct. 2003.*
International Search Report (PCT/ISA/210) dated Nov. 18, 2014, by the Japanese Patent Office as the International Searching Authority for International Application No. PCT/JP2014/072713.
Written Opinion (PCT/ISA/237) dated Nov. 18, 2014, by the Japanese Patent Office as the International Searching Authority for International Application No. PCT/JP2014/072713.

* cited by examiner

PRODUCTION METHOD FOR CONCENTRATED PRODUCT USING MEMBRANE-CONCENTRATION METHOD AND FREEZE-CONCENTRATION METHOD

BACKGROUND

Technical Field

The present invention relates to a production method for concentrated products using a freeze-concentration method.

Description of the Prior Art

The freeze-concentration method is provided for preventing a liquid to be treated (as derived from the fluid to be treated) from being heated excessively while it is being concentrated, and can provide concentrated liquids without causing any changes in the flavor or taste due to the applied heating or warming effects (as represented by the disagreeable odors produced by the applied heating and the like).

Typically, the freeze-concentration method includes the suspension crystal deposition method (the suspension crystal concentration method) for generating an ice crystal in granular forms within the crystal deposition container and the interfacial advance freeze-concentration method for allowing an ice crystal to be grown onto the cooled surface, both of which are known to the prior art. In general, the interfacial advance freeze-concentration method is very often employed as the freeze-concentration method because it is considered that this method provides the easy solid-liquid separation such as the separation of ice (water) and concentrated liquid.

As one example of the freeze-concentration apparatus, the Patent Document 1, which was granted under the Japanese patent No. 4306018, proposes to provide the scraper-type heat-conducting freeze-concentration method and the scraper-type apparatus that implements that method. As another example of the freeze-concentration apparatus, the Patent Document 2, which was granted under the Japanese patent No. 4429665, proposes to provide the advance freeze-concentration method and the apparatus that implements that method.

Another freeze-concentration method is also proposed which can prevent the quality of the concentrated liquids, such as fruit juice, coffee, teas and the like among other foods in liquid forms, from being affected or reduced. As still another example of the freeze-concentration method, the Patent Document 3 describes that the reduction of the quality of the concentrated liquid such as the fruit juice and the like could be prevented by combining the interfacial advance freeze-concentration method with the deoxidizing process. In addition, it describes that this method can also be applied to milk.

As one example of the suspension crystal concentration method, the Patent Document 4 proposes to provide a method that includes several concentration stages and wherein the concentration can be provided efficiently by using the suspension crystal concentration method, that is, by forming a specific crystal having a predetermined size during one of the stages, transferring the thus formed specific crystal to the recrystallizing container containing a concentrated liquid with a low concentration degree during another stage and transferring the resulting specific crystal to the recrystallizing container containing a concentrated liquid with a lower concentration degree during still another stage.

PRIOR TECHNICAL DOCUMENTS

Patent Documents

Patent Document 1: Japanese laid-open Patent Publication No. 2000-334203

Patent Document 2: Japanese laid-open Patent Publication No. 2005-81215

Patent Document 3: Japanese laid-open Patent Publication No. 2006-166880

Patent Document 4: Japanese laid-open Patent Publication No. S57(1982)-105202

SUMMARY OF THE INVENTION

The freeze-concentration method is provided for preparing a concentrated liquid without causing any changes in the flavor or taste due to the applied heating or warming effects because the liquid to be treated is not heated excessively while it is being concentrated. The before described any changes in the flavor or taste due to the applied heating or warming effects is such as any disagreeable odors produced by the applied heating and the like, for example. Furthermore, this method can prevent the growth of any microorganisms contained in the concentrated liquid due to the applied heating or warming effect, minimizing the risk that the concentrated liquid may be deteriorated by the microorganisms or may be contaminated by the microorganisms. This is the reason why the freeze-concentration method is considered to be suited for concentrating any material in liquid forms, such as the milk elements that has not yet been sterilized, that is supposed to contain more microorganisms.

In the conventional prior art, however, it is found that it is difficult to use the freeze-concentration method for preparing the concentrated liquid when concentrating any particular milk elements (such as, for example, raw milk, skimmed milk, fermented milk (such as the fermented milk in liquid forms, drink yogurt and the like), lactic acid beverage, whey, buttermilk and the concentrated liquids thereof (such as the membrane concentrated liquids and the like).

One of the reasons is that more losses may be produced when the freeze-concentration method is used to concentrate the milk elements. For example, when the conventional known freeze-concentration method (such as the interfacial advance freeze-concentration method, for example) is used to concentrate the milk elements, such as the starting material milk and the like, that has not yet been sterilized and when the solid content concentration (solid content quantity) of such starting material milk that has not yet been concentrated will be concentrated by up to two times the solid content concentration (solid content quantity), it is found, in most cases, that about 2% by weight of the total concentrated liquid, which is expressed in terms of the solid content quantity, may be lost without being retained therein.

When a large amount of the milk elements are concentrated such as the case in which milk products are manufactured on the large scale (commercial scale), the high loss rate represents the unintended wastes, which present a major obstruction to the use of the freeze-concentration method for the purpose of concentrating the milk elements. As such, it is found that it is difficult to use the freeze-concentration method for concentrating the milk elements when it is practically applied for the concentration purpose because this method is not economical from the aspect of the worse production efficiency.

When it is then supposed that the multi-stage back flow concentration method as disclosed in Patent Document 4 is employed, it is required that more than one freeze-concentration apparatus should be installed and used simultaneously. It was not easy to obtain the satisfactorily good efficiency.

From the standpoint of the fact described above, it is known to the prior art that the decompression heating concentration method or the membrane concentration method (such as the reverse osmosis membrane, RO membrane, Nano filter membrane and NF membrane, for example) has been employed alone or in combination for the purpose of concentrating the milk elements.

Here, the decompression heating concentration method should be understood to refer to the concentration method in which any moisture can be evaporated from the liquid to be treated in the state in which the temperature of the milk elements is raised to the order of 40 to 80° C. and in the atmosphere in which the pressure has been reduced by means of the vacuum pump or the like.

For the decompression heating concentration method, however, it is known that the microorganisms contained in the concentrated liquid are allowed to be grown within several days from the day on which the concentration has been started for the milk elements, such as the starting material milk and the like, which have not yet been sterilized. The manner in which the growth occurs is also reflected as the number of microorganisms existing in the concentrated liquid that has actually been prepared. In order to decrease the number of microorganisms, on the other hand, the case may be assumed in which the milk elements that have been concentrated by the decompression heating concentration method would be sterilized by the applied heating. In this assumption, the concentrated liquid of the milk elements may have the high solid content concentration degree that comes from the milk component, and there is therefore the risk that the milk component may be attached to the heat conducting surface being heated by the heating sterilizer devices (such as the plate-type sterilizer, the tube-type sterilizer, the injection-type sterilizer, the infusion-type sterilizer, the scraper-type sterilizer and the like) or may be attached to the nozzles by burning, which may affect the physical property or quality greatly (such as the increased viscosity, the produced cohesion and the like, for example). For this reason, it is difficult or practically impossible to sterilize the milk elements that are thus concentrated continuously for a longer time period, thereby decreasing the number of microorganisms contained therein.

For the membrane concentration method, it should be understood to mean the method of removing any moisture from the liquid to be treated wherein the separated membrane such as the reverse osmosis membrane and the like is used in the state in which the milk elements are cooled (5 to 10° C., for example), and the liquid to be treated is pressurized by the pressuring pump or the like.

For the membrane concentration method, however, it is known that the liquid to be treated has the low concentration limit within which the liquid can be concentrated. When the milk elements such as the starting material milk that have not been sterilized are to be membrane concentrated during the simple membrane concentration step, for example, it is difficult or practically impossible to increase the solid content concentration in the milk elements up to above 30 to 40% by weight thereof.

It is therefore an object of the present invention is to provide a production method for manufacturing concentrated products by using a freeze-concentration method having a high yield rate (low loss rate) that is practically applicable as required in large-scale (commercial scale) production.

Upon examining the above-mentioned problems very carefully, the inventors of the present invention have found that as compared with the conventional freeze-concentration method, it is possible to decrease the processing time (concentration time) effectively when the fluid to be treated is expressed in terms of its unit capacity or volume (unit weight), by combining the concentration of the fluid to be treated using the membrane-concentration method (such as the reverse osmosis membrane method: the RO membrane method, the nano filtration method: the NF membrane method: the ultra filtration method: the UF membrane method, the precision filtration membrane method: the MF membrane method and the like) and the concentration of the before described fluid to be treated concentrated by the before described membrane-concentration method following the before described membrane-concentration using the suspension crystal deposition method (or the suspension crystallizing method) with the separation and discharge of the ice crystal generated by the before described suspension crystal deposition method and by performing the before described combination process in the continuous manner.

The inventors have also found that for the concentration of the fluids to be treated using the membrane-concentration method, the fluids to be treated or the concentrated fluids to be treated is cooled to the temperature that can be adjusted to 0 to 20° C. so that those fluids to be treated can be prevented from being heated excessively and that it is therefore possible to manufacture the freeze-concentrated products (freeze-concentrated foods) on the commercial basis that can be stored stably for a long time while they can retain the flavors possessed inherently by the fluids to be treated (such as the milk elements and the like).

It has been found that in the case where any of the milk elements is used as the fluid to be treated and it is desired that its solid content concentration should be improved (or concentrated) from about 12% by weights to 30% by weight, the processing time (concentration time) required for the concentrated products (that is, the membrane-concentrated milk foods) according to the present invention can be reduced by up to about 70% relative to the time required for the conventional concentrated products (that is, the freeze-concentrated milk foods according to the conventional freeze-concentration method). For a specific example in which 100 kg of the milk element is specifically used as the fluid to be treated and it is desired that its solid content concentration is to be concentrated from about 12% by weight to about 30% by weight, it has been found that the processing time required for preparing the concentrated products in accordance with the present invention is about thirty (30) hours whereas the processing time required for preparing the conventional concentrated products in accordance with the conventional freeze-concentration method is about forty (40) hours.

When a large amount of any particular milk element is to be concentrated as for the large-scale (commercial-scale) production of the milk products, the time (processing time) required from the time when the concentration of the milk element is begun until the time when the resulting milk products are collected is relatively long, which means that it presents a great obstruction to the use of the freeze-concentration method for the purpose of the concentration of the milk element. It may be understood from the above that the conventional freeze-concentration method cannot respond quickly to demands for manufacturing the concentrated products and it is therefore difficult to employ the freeze-concentration method for concentrating the milk element for the practical purposes.

The invention according to claim 1 provides a method for producing concentrated products using a membrane-concentration method and a freeze-concentration method, which comprises:

a membrane-concentration step in which a fluid to be treated is cooled and a membrane-concentrated fluid is prepared by membrane-concentrating the solid content concentration thereof by more than 1.5 times by using any one of the reverse osmosis membrane, the nano filtration membrane, the ultrafiltration membrane and the precision filtration membrane;

an ice crystal generation step in which said membrane-concentrated fluid is cooled, ice crystals of said membrane-concentrated fluid are generated in said membrane-concentrated fluid, and a mixed fluid to be treated is formed wherein said mixed fluid to be treated is comprised of said ice crystals and a concentrated fluid to be treated produced from said membrane-concentrated fluid by generating said ice crystals in said membrane-concentrated fluid thereby said membrane-concentrated fluid is concentrated; and an ice crystal separation step in which said mixed fluid is separated into said concentrated fluid to be treated and said ice crystals, and said separated concentrated fluid to be treated is retrieved.

The invention according to claim 2 provides the method for producing concentrated products using a membrane-concentration method and a freeze-concentration method as defined in claim 1, wherein said step of preparing said membrane-concentrated fluid, forming said mixed fluid composed of said ice crystals and said concentrated fluid to be treated produced from said membrane-concentrated fluid by further concentrating said concentrated fluid produced from said membrane-concentrated fluid, and said step of separating said mixed fluid into said concentrated fluid to be treated and said ice crystals and retrieving said concentrated fluid to be treated are performed on the batch basis.

The invention according to claim 3 provides the method for producing concentrated products using a membrane-concentration method and a freeze-concentration method as defined in claim 1 or 2, wherein said ice crystal generation step and said ice crystal separation step following said ice crystal generation step are repeated one time or more than one time for said concentrated fluid to be treated that has been retrieved during said ice crystal separation step.

The invention according to claim 4 provides the method for producing concentrated products using a membrane-concentration method and a freeze-concentration method as defined in claim 3, wherein said ice crystal generation step following the second and subsequent time is performed for fresh fluid to be treated, which is obtained by additionally adding said membrane-concentrated fluid prepared by said membrane-concentration step having the capacity equivalent to that of said ice crystals that have been separated during said immediately preceding ice crystal separation step to said concentrated fluid to be treated that has been retrieved during said immediately preceding ice crystal separation step.

The invention according to claim 5 provides the method for producing concentrated products using a membrane-concentration method and a freeze-concentration method as defined in any one of claims 1 through 4, wherein said fluid to be treated is any one of raw milk, skimmed milk, fermented milk (such as fermented milk in a liquid forms, drink yogurt and the like), lactic acid beverage, whey, and buttermilk.

The invention according to claim 6 provides the method for producing concentrated products using a membrane-concentration method and a freeze-concentration method as defined in any one of claims 1 through 5, wherein as compared with the products that are not treated, the concentrated products obtained by any one of production method described in claims 1 through 5 contain the fragrance component retained to be more than 0.7 times.

The invention according to claim 7 provides the method for producing concentrated products using a membrane-concentration method and a freeze-concentration method as defined in any one of claims 1 through 6, wherein as compared with the products that are not treated, the products obtained by any one of production method described in claims 1 through 6 contain the live bacteria of useful microorganisms retained to be more than 0.7 times.

Advantages of the Invention

According to the present invention, a production method is provided for manufacturing concentrated products effectively by using (using in combination) a membrane-concentration method and a freeze-concentration method having a high yield rate (low loss rate) that is practically applicable as required in large-scale (commercial scale) production.

According to the present invention, it can reduce the processing time (concentration time) effectively as compared with the conventional freeze-concentration method when it is expressed in terms of the unit capacity (unit weight) of the fluid to be treated.

According to the present invention, the concentrated products can be manufactured at the low loss rate by using the membrane-concentration method and the freeze-concentration method, by reducing the loss rate for the resulting wastes, which is expressed in terms of the solid content quantity, by less than about 0.5% by weight thereof.

Specifically, for the conventional freeze-concentration method (such as the interfacial advance freeze-concentration method, for example), about 2% by weight of the total solid content quantity of the fluid to be treated that has not yet been concentrated will be wasted, which means that the solid content whose quantity is equal to the wasted solid content will be lost. In accordance with the freeze-concentration method that is used to manufacture the concentrated products by using the membrane-concentration method and the freeze-concentration method in accordance with the present invention, however, the loss can be reduced to less than one fourth (¼) of the loss that would be caused by the conventional freeze-concentration method.

According to the present invention, the concentration can be performed at the low temperature (such as 0 to 20° C. and the like) or below the freezing point under which the microorganisms can not be allowed to be grown and that the concentration operation can be performed (that is, the freeze-concentration apparatus can be run) in the continuous manner for a long time while the growth of the microorganisms in the concentrated liquid is being controlled or restricted.

Further, according to the freeze-concentration method that is used to manufacture the concentrated products by using the membrane-concentration method and the freeze-concentration method in accordance with the present invention, there are two separate sections, one section for discharging the concentrated fluid and the other section for removing the water. In the instance where the particular milk element is to be concentrated, for example, its solid content concentration can be increased easily by about 30 to 40% by weight thereof.

Because the freeze-concentrated products that are obtained by the present invention have not be heated excessively, they can be stored stably for a long time with the flavor or taste possessed inherently by the fluid to be treated (such as the milk elements and the like) being retained therein so that they can be offered on the commercial basis.

With respect to a concentrated foods (such as the concentrated milk and the like), if the fluid to be treated has a high concentration degree, it is difficult to sterilize the concentrated fluid subsequently following the concentration step. According to the present invention, the fluid to be treated (such as the milk elements and the like) can be concentrated in the sanitary manner. Because the fluid to be treated is concentrated at the low temperature (such as 0 to 20° C.) or below the freezing point under which the microorganisms can not be allowed to be grown. So that, the operating conditions (running conditions) and the like under which the heating sterilization occurs during the subsequent step following the concentration step can be set to the moderate values.

According to the present invention, the concentrated foods (such as the concentrated milk and the like) have the high concentration degree that could not be achieved by the conventional freeze-concentration method, and can provide the better flavors or tastes and the less disagreeable odors that would be produced by the applied heating. As compared with the conventional freeze-concentration method, therefore, the foods can be manufactured more effectively within a shorter time and any resulting solid content loss rate can be controlled or restricted to the minimum value. For the buttermilk or buttermilk product (such as the concentrated liquid and the like) that is obtained by the conventional method, furthermore, the flavors or tastes tend to be deteriorated easily due to the applied heating effect and the microorganisms tend to be allowed to be grown easily even if they are stored in the frozen atmosphere. In accordance with the present invention, on the other hand, when the concentrated buttermilks, which are not yet sterilized, are used as the fluids to be treated and are manufactured, they exhibit the remarkable advantage in that they can be manufactured while the flavors or tastes will not be affected (such as deteriorated) by the applied heating effect and the microorganisms will not be allowed to be grown easily even when they are stored for several days in the frozen atmosphere.

BEST MODE OF EMBODYING THE INVENTION

Figure 1:
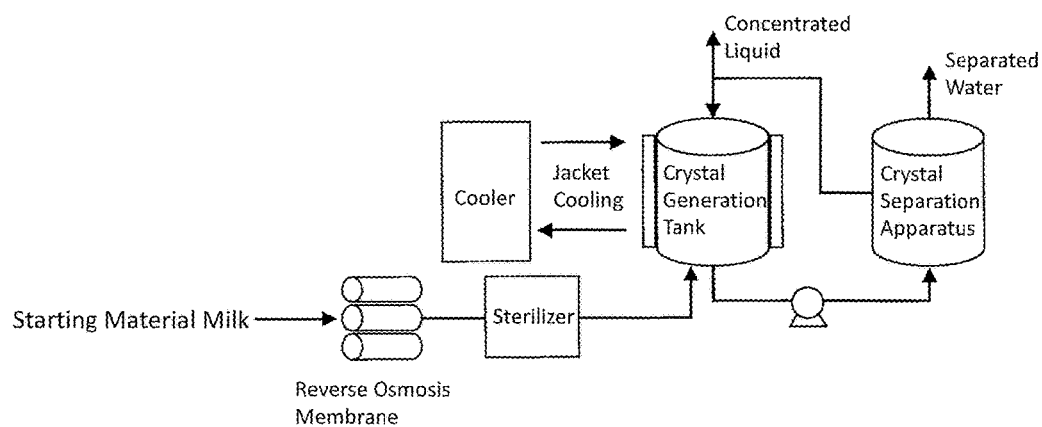
FIG. 1 is a schematic diagram illustrating one example of the arrangement of the apparatus including the sequence of the membrane-concentration apparatus and the freeze-concentration apparatus that is used to manufacture a concentrated product in accordance with one embodiment of the present invention.

The production method for manufacturing concentrated products using the membrane-concentration method and the freeze-concentration method in accordance with the present invention includes a membrane-concentration step during which a membrane-concentrated fluid is prepared by concentrating a corresponding fluid to be treated using the membrane-concentration method. This production method further includes a step of utilizing a suspension crystal deposition method (which may be called as the suspension crystallizing method) that follows the membrane-concentration step, wherein the freeze-concentration method can be used to generate an ice crystal in the granular forms in the membrane-concentrated fluid that has been placed into the crystal deposition container, thereby concentrating the membrane-concentrated fluid obtained by the before described membrane-concentration step. In its specific form, the freeze-concentration method includes an ice crystal generation step and an ice crystal separation step, which will be described later.

During the membrane-concentration step, the fluid to be treated is cooled (or being cooled), the fluid to be treated is stirred as required, and a membrane-concentrated fluid is then prepared (produced) by membrane-concentrating its solid content concentration by more than 1.5 times by using any one of the reverse osmosis membrane, the nano filtration membrane, the ultra filtration membrane and the precision filtration membrane.

During the membrane-concentration step, the multiplication degree by which the fluid to be treated is to be membrane-concentrated or the solid content concentration that results from the above concentration is not limited to any particular value as long as the solid content concentration for the fluid to be treated can be concentrated (improved) by more than 1.5 times. From the aspect of the present invention in which the processing time (concentration time) can be reduced effectively when it is expressed in terms of the unit capacity or volume (unit weight), the specific multiplication degree can be 1.5 to 3 times, preferably 1.6 to 2.7 times, more preferably 1.7 to 2.5 times and much more preferably 1.8 to 2.2 time, and its specific solid content concentration can be 12 to 30% by weight, preferably 14 to 28% by weight, more preferably 16 to 25% by weight and much more preferably 18 to 28% by weight.

During the membrane-concentration step, any known separation membrane may be used if the solid content concentration for the fluid to be treated can be concentrated by more than 1.5 times. From the aspect of the present invention in which any moisture can be removed effectively by separating any required nutrient component and restricting any possible loss of the solid content, therefore, the specific separation membranes may include the reverse osmosis membrane, the nano filtration membrane, the ultra filtration membrane and the precision filtration membrane, preferably the reverse osmosis membrane, the nano filtration membrane and the ultra filtration membrane, more preferably the reverse osmosis membrane and the nano filtration membrane, and most preferably the reverse osmosis membrane.

During the membrane-concentration step, the temperature for the fluid to be treated is not limited to any particular value if the solid content concentration for the fluid to be treated can be concentrated by more than 1.5 times. From the aspect of the present invention in which the fluid to be treated can be processed in the continuous manner during the long time period while the microorganisms cannot be allowed to be grown and the growth of the microorganisms can be controlled or restricted, therefore, the specific temperature range should be 0 to 25° C., preferably 2 to 20° C., more preferably 4 to 18° C. and much more preferably 6 to 15° C. If this temperature should rise above 25° C., the membrane concentration efficiency may be improved but there is the possibility that the microorganisms might be allowed to be grown easily and the quality of the resulting concentrated products might be deteriorated. If the temperature should fall below 0° C., on the contrary, there is the possibility that the fluid to be treated or membrane-concentrated fluid to be treated might be frozen and solidified and the ability of the fluid to be treated or membrane-concentrated fluid to be treated to flow might be reduced, reducing the membrane-concentration efficiency.

During the ice crystal generation step which follows the membrane-concentration step and which is performed by using the freeze-concentration method, the membrane-concentrated fluid which has been prepared by the membrane-concentration step is cooled (or being cooled), is stirred as required, and an ice crystals of said membrane-concentrated fluid are generated in said membrane-concentrated fluid, and a mixed fluid to be treated is formed wherein said mixed fluid to be treated is comprised of said ice crystals and a concentrated fluid to be treated produced from said membrane-concentrated fluid by generating said ice crystals in said membrane-concentrated fluid thereby said membrane-concentrated fluid is concentrated.

During the ice crystal separation step following the ice crystal generation step, the mixed fluid is separated into the concentrated fluid to be treated and the ice crystals by using a separation device such as a separating filter (through which solid and liquid are separated) and the concentrated fluid to be treated is then retrieved.

As a fluid to be treated is concentrated in the manner described above and the concentrated product is then manufactured, the fluid to be treated is not be heated or warmed during the concentration process and therefore the flavor or taste would not be altered, which may be caused by excessive heating or warming during concentration process.

The fluid to be treated to which the method for producing concentrated products of the present invention can be applied includes the milk elements each containing the milk component, examples of which may include the raw milk, the skimmed milk, the fermented milk (such as the fermented milk in liquid forms, the drink yogurt and the like), the lactic acid beverage, the whey, the buttermilk and the concentrated fluids thereof (such as the membrane concentrated fluids and the like).

In the production method for a concentrated product using the membrane-concentration method and the freeze-concentration method of the present invention, previously described ice crystal generation step and previously described ice crystal separation step following said ice crystal generation step may be repeated one time or more than one time for said concentrated fluid to be treated that has been retrieved during said ice crystal separation step.

In this way, the concentration can be performed below the freezing point under which the microorganisms will not be allowed to be grown. In the instance of the particular milk element, for example, its solid content concentration can be increased easily by about 30 to 40% by weight thereof while the number of microorganisms will be retained or decreased before it is concentrated.

For this instance, it should be noted that the ice crystal generation step following the second and subsequent time is performed for fresh fluid to be treated, which is obtained by additionally adding said membrane-concentrated fluid prepared by said membrane-concentration step having the capacity equivalent to that of said ice crystals that have been separated during said immediately preceding ice crystal separation step to said concentrated fluid to be treated that has been retrieved during said immediately preceding ice crystal separation step.

Figure 2:
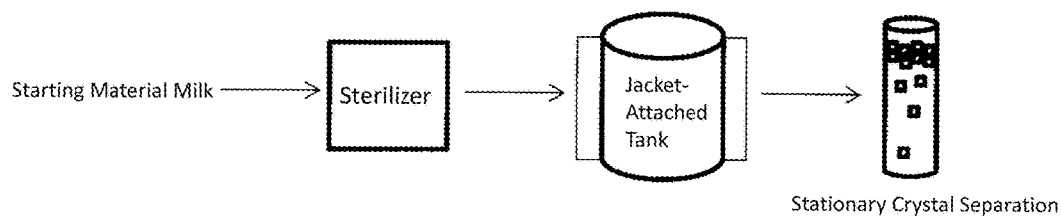
FIG. 2 is a schematic diagram illustrating the steps of the batch based processing step in accordance with one embodiment of the present invention.

FIG. 1 is a schematic diagram illustrating one example of the freeze-concentration apparatus including the membrane-concentration apparatus and the freeze-concentration apparatus for use in manufacturing concentrated products in accordance with one embodiment of the present invention (specifically, the apparatus that implements the freeze-concentration method of the present invention). FIG. 2 is a schematic diagram illustrating the steps of the concentration process in general that occurs on the batch basis by using some parts of the apparatus shown in FIG. 1. Then, several preferred embodiments of the present invention will be described below by referring to FIG. 1.

In the apparatus having the arrangement shown in FIG. 1, a fluid to be treated (such as the starting material milk, for example) is initially subjected to the membrane concentration process using the reverse osmosis membrane (RO membrane) in the predetermined temperature state (0 to 20° C. Following this process, the fluid to be treated is sterilized as required by means of the known sterilizer, the example of which is shown in FIG. 1, and is then transported to the concentration process using the freeze-concentration method.

During the process using the freeze-concentration method, the freeze-concentration apparatus, the example of which is shown in FIG. 1, is used.

The freeze-concentration apparatus illustrated in FIG. 1 includes a crystal generation tank (jacket-attached tank) into which a fluid to be treated (such as the membrane-concentrated starting material milk that has been concentrated during the membrane concentration process described above, for example) may be placed, the tank having the internal diameter of 20 cm, the height of 100 cm, the gate type stirring blades and the capacity of 140 kg, for example, and a crystal separation column equipped with a separation filter. The crystal generation tank and the crystal separation column are connected to each other through a transport pump through which a mixed fluid can be transported from the crystal generation tank to the crystal separation column.

Any suitable refrigerant (such as ammonia, glycol and the like) may be fed from the freezer to the jacket-attached crystal generation tank from a freezer. The fluid to be treated (such as the membrane-concentrated starting material milk, for example) within the crystal generation tank is cooled indirectly by causing the refrigerant fed from the freezer to flow through the jacket. It should be noted that the stirring blades shaped like the gate may be provided in the crystal generation tank and the fluid to be treated (such as the membrane-concentrated starting material milk, for example) within the crystal generation tank may be stirred by the stirring blades as required. The whole fluid to be treated may thus be cooled effectively while the fluid to be treated is being stirred.

The jacket-attached tank, within which the stirring blades are mounted, has been described hereinabove as the jacket-attached tank that implements the stirring functions. It may be appreciated that any type of the jacket-attached tank that provides the equivalent stirring capabilities may be used without any limitations to that type. Specifically, as long as the stirring functions are equivalent to those of the gate-type stirring blades, the stirring method is not limited to any method using the gate type stirring blades. For example, the coil-type stirring blades may be used. Other types that can be used include the saw tooth disk turbine, the pitched type turbine, the anchor-type turbine, the propeller-type turbine and other stirring blade types.

In order to reduce the operation time required until the ice crystal can be generated, it is preferred that the refrigerant will be caused to flow through the jacket or otherwise, the refrigerant will be caused to flow through the stirring blades.

As one example of the means for causing the refrigerant to flow through the jacket or stirring blades, the cooling device may be mounted within the tank so as to permit the refrigerant to flow through the tank, as it is known to the prior art. By using this cooling means, the time required for generating the ice crystal can be reduced by causing the refrigerant to flow through the stirring blades that may have the various shapes described above as examples.

The mixed fluid fed into the crystal separation column through the transport pump will be separated into the ice crystals and the concentrated fluid to be treated (concentrated liquid) by means of the separating device mounted within the crystal separation column. Said mixed fluid is composed of the ice crystals and the concentrated fluid to be treated which is obtained by generating said ice crystals in the fluid to be treated (such as the membrane-concentrated starting material milk, for example). The ice crystals thus separated from the mixed fluid will be dissolved or fused by the warm water and the like, which will go out of the freeze-concentration apparatus as the separated water. The separation device within the crystal separation column may include the separating filter, but the separation method is not limited to this separation filter. As an alternative example, the centrifugal separator may be used. As a further alternative example, the ice crystals may be separated by setting the mixed fluid stationary.

When the separation is performed for separating the ice crystals and the concentrated fluid to be treated as it remains to be stationary, the container designed for use in performing the stationary separation (the stationary separation tank) may be used. Said mixed fluid is delivered from said jacket-attached tank to said stationary separation container, and the separation is performed as it remains to be stationary. Within the container, the layer of the ice crystals is formed on the upper side and the layer of the concentrated fluid to be treated is formed on the lower side. When the solid content in the concentrated fluid to be treated has reached a desired concentration degree, the concentrated fluid to be treated and the ice crystals will be discharged from said stationary separation tank (the stationary separation container).

The concentrated fluid to be treated (concentrated liquid) will be retrieved as the concentrated product that has been manufactured by the method of the present invention. The whole part or some part of which will be returned to the crystal generation tank where it will be concentrated further (through the ice crystal generation step and the ice crystal separation step). For this purpose, any suitable means for enabling the whole or some parts of the concentrated fluid to be returned to the crystal generation tank may be disposed on the middle way of the discharge pipe for the concentrated fluid to be treated (concentrated liquid).

In accordance with the present invention, therefore, there are two sections. One section is for removing the water where the ice crystals of the fluid to be treated that has been generated in the crystal generation tank and separated through the crystal separation column. And the other section is for discharging the concentrated fluid where the concentrated fluid to be treated may be retrieved as the concentrated product manufactured by the present invention.

The delivery pipe for feeding or placing the fluid to be treated to or into the crystal generation tank includes a supply adjusting means which is attached to the delivery pipe. This supply adjusting means is provided for adjusting the weight or capacity of the fluid to be treated (such as the membrane-concentrated starting material milk, for example) and to be delivered to or placed into the crystal generation tank, depending on the weight or capacity of the concentrated fluid to be treated ((such as the membrane-concentrated starting material milk, for example) which will be returned to the crystal generation tank through the returning (circulating) means.

For example, when the concentrated fluid to be treated (concentrated liquid) is returned to the crystal generation tank through the returning means, the ice crystals have been separated by means of the separating filter provided in the crystal separation column. Said separated ice crystals are dissolved or fused by the warm water and the like and will go out of the freeze-concentration apparatus as separated water. The fluid to be treated having the weight or capacity of said separated water will be delivered to or placed into the crystal generation tank through the delivery pipe including the supply adjusting means. The supply adjusting means adjusting the weight or capacity of the fluid to be treated (such as the membrane-concentrated starting material milk, for example), which is delivered to or placed into the crystal generation tank through the delivery pipe, to the weight or capacity of said separated water.

During the ice crystal generation step, the fluid to be treated (such as the membrane-concentrated starting material milk, for example) will be stirred if necessary, while it is being cooled, and an ice crystal of the fluid to be treated (such as the membrane-concentrated starting material milk, for example) will be formed therein. As the ice crystal is generated, it will cause a mixed fluid composed of the generated ice crystal and the concentrated fluid to be treated, produced and concentrated by the generation of the ice crystal.

It may be appreciated from the above description that the jacket-attached tank that provides the stirring capability may be used (employed) for the crystal generation tank (crystal separation container) where the ice crystal generation step is performed. For example, this tank has the internal diameter of 20 cm and the depth of 100 cm, and is equipped with the stirring blades shaped like the gate. It is capable of stirring the fluid to be treated therein at the rate of 60 to 300 rpm, preferably 100 to 200 rpm. If the fluid to be treated has the shearing stress, the Reynolds number and the like which are substantially equivalent to those of the examples of the fluid to be treated listed and described so far herein, the number of revolutions of the stirring blades that may be selected optionally can be set freely since it is thought that the generation of the ice crystal can be controlled properly.

The refrigerant, such as ammonia and like that is able to flow, will be delivered into the jacket mounted outside the tank. Preferably, the temperature of the refrigerant may have the range of the temperature that is enough to cause the fluid to be treated (such as the membrane-concentrated starting material milk, for example) within the tank to generate an ice crystal in liquid forms. In general, the temperature may be less that $-2°$ C., preferably the range of between $-6$ and $-8°$ C., for example.

The fluid to be treated (such as the membrane-concentrated starting material milk, for example), for which the concentration is actually performed, will be placed into the jacket-attached tank (the crystal separation tank), and an ice crystal will be generated by cooling the fluid to be treated by means of the refrigerant of $-6$ to $-8°$ C. that is being circulated through the jacket. In this instance, the fluid to be treated (such as the membrane-concentrated starting material milk, for example) may be cooled by stirring said fluid to be treated by means of the stirring blades in said tank which may be revolving at the rate of 60 to 300 rpm. An ice crystal will thus be generated.

In order to reduce the time required for generating an ice crystal, the refrigerant may be circulating through said jacket, or otherwise may be circulating through the stirring blades. As an example of circulating the refrigerant through the stirring blades, it is known that any suitable cooling means through which the refrigerant is circulating within said tank is mounted in said tank. The time required for generating an ice crystal can be reduced by this circulating means, that is, by circulating the refrigerant through the examples of the stirring blades having the various shapes listed and described above herein.

Although the generation of an ice crystal may be varied, depending on the particular freezing temperature or the particular magnification value at which the fluid to be treated (such as the membrane-concentrated starting material milk, for example) will be concentrated, the fluid to be treated can be cooled up to 0.0° C. to −2.5° C., for example, after which the ice crystal in the fluid to be treated may be allowed to be grown during the period of two to five hours, preferably during the period of three to five hours until it can have the average size of over 100 μm. Specifically, for the ice cream products in general, it is said that the ice crystal has the average size of about 30 to 40 μm immediately after it has been frozen and it has the average size of about 45 to 55 μm after it has been hardened completely. For the freeze-concentration step in accordance with one embodiment of the present invention, on the other hand, the ice crystal can be generated for a shorter time and the fluid to be treated can be separated more easily by means of the separating filter. From those aspects, the ice crystal in the fluid to be treated can be allowed to be grown until it can be generated to have the average size of more than 100 μm, which means that this value is greater than that of the ice cream products in general. More specifically, the ice crystal can be allowed to be grown until it can be generated to have the average size of 100 to 3000 μm, preferably 150 to 2500 μm, more preferably 200 to 2000 μm, much more preferably 250 to 1500 μm, and most preferably 300 to 1000 μm.

From the aspect of the fact that the fluid to be treated (such as the membrane-concentrated starting material milk, for example) can be stirred smoothly when it is cooled while it is being stirred, it is preferred that the resulting ice crystal in the fluid to be treated should have the concentration degree that is substantially equal to below 50% by weight, preferably below 45% by weight, and more preferably below 40% by weight. If the fluid to be treated can be stirred with the strength of any particular required power, however, there is no problem even if the resulting ice crystal has the concentration degree that is equal to above 50% by weight.

Subsequent to the ice crystal generation step, a mixed fluid, which is composed of the concentrated fluid to be treated for which the concentration has been performed by the generation of the ice crystal and the resulting ice crystal, will be formed, which will be delivered from the jacket-attached tank (the crystal generation tank) to the crystal separation column where the ice crystal separation step is performed. During the ice crystal generation step, in this instance, the mixed fluid described above may be delivered from the jacket-attached tank (the crystal generation tank) to the crystal separation column at the time when the mixed fluid has reached its predetermined magnification value and the process can proceed to the ice crystal separation step.

When proceeding from the ice crystal generation step to the ice crystal separation step, said fluid to be treated (such as the membrane-concentrated starting material milk, for example) may be concentrated at the magnification value that is substantially equal to about three times although, it may depend on the particular type or physical property of the fluid to be treated. At this time (that is, at the time when the temperature of the fluid to be treated has fallen up to −2.5 to −2.0° C.), the mixed fluid described above may be delivered from the jacket-attached tank (the crystal generation tank) to the crystal separation column where the ice crystal separation step is performed.

The fluid to be treated (such as the membrane-concentrated starting material milk, for example) which has the weight or capacity substantially equivalent to that of the mixed fluid that is delivered from the jacket-attached tank (crystal generation tank) to the crystal separation column may be delivered to the crystal generation tank where the freeze-concentration apparatus can then be run continuously in accordance with one embodiment of the present invention. The apparatus can also be run on the stationary mode as shown in FIG. 2.

During the ice crystal separation step, the mixed fluid will be separated by the separating device in the crystal separation column into the ice crystals and the concentrated fluid to be treated (concentrated liquid), from which the concentrated fluid to be treated (concentrated liquid) will then be retrieved. The ice crystals thus separated will be dissolved or fused by the warm water and the like, which results in being the separated water which will go out of the freeze-concentration apparatus.

The separating filter may be used for the separation device in the crystal separation column. As the separating filter is usually used to separate the ice crystal generated during the ice crystal generation step, in this instance, the separating filter may have the average size of approximately 100 μm or more than 100 μm if it is desired that the ice crystal should be allowed to be grown until it can be generated to have the average size of more than 100 μm as discussed above.

The size of the separating filter may be determined appropriately by considering the type or property of the fluid to be treated, the size of the ice crystal generated during the ice crystal generation step and the processing efficiency for the fluid to be treated. At the minimum, the size of the filter may be determined such that it is enough to separate the ice crystal generated during the ice crystal generation step.

The separation step may also be performed on the stationary mode. When the ice crystal and the concentrated fluid to be treated are separated on the stationary mode, the stationary separation container (the stationary separation tank) may be used. The mixed fluid will be delivered from the jacket-attached tank to the stationary separation container (the stationary separation tank) where the separation occurs on the stationary mode. Within the container or tank, a ice crystal layer is formed on the upper side and a concentrated fluid layer is formed on the lower side. When the solid content in the concentrated fluid to be treated has reached its desired concentration degree, the concentrated fluid to be treated and the ice crystal are discharged from the stationary separation container (stationary separation tank).

Although the concentrated fluid to be treated (concentrated liquid) that has been separated from the ice crystals may be used as it is, that is, it may be used as the final concentrated product to be manufactured in accordance with one embodiment of the present invention, it is possible to increase the magnification value at which the fluid to be treated will be concentrated, by passing the final concentrated product through the ice crystal generation step and the subsequent ice crystal separation step once more. For the concentrated fluid to be treated (concentrated liquid) that has been retrieved during the ice crystal separation step, for example, the ice crystal generation step described previously and the subsequent ice crystal separation step described previously may be repeated one or more times. By repeating the two steps as described above, the concentrated fluid can be concentrated simply and more heavily so that it can contain the solid content having the concentration degree of 20 to 50% by weight, preferably 25 to 45% by weight, and more preferably 30 to 40% by weight. From the aspect of the fact that the concentrated fluid thus concentrated can retain or improve the physical property, quality, flavor, taste and the like that are possessed inherently by the starting material milk (milk element), it is considered that the solid content concentration degrees mentioned above are desirably preferred.

FIG. 1 is a flow chart diagram showing that some parts of the concentrated fluid to be treated (concentrated liquid) as separated from the ice crystal may be used as the final concentrated products to be manufactured in accordance with one embodiment of the present invention while the remaining parts of the concentrated fluid are passed again through the ice crystal generation step and the subsequent ice crystal separation step in order to increase the degree by which the concentration is multiplied.

It should be noted that the ice crystal generation step following the second and subsequent time is performed for fresh fluid to be treated, which is obtained by additionally adding said fluid to be treated (such as the membrane-concentrated starting material milk, for example) having the capacity equivalent to that of said ice crystals that have been separated during said immediately preceding ice crystal separation step to said concentrated fluid to be treated (concentrated liquid) that has been retrieved during said immediately preceding ice crystal separation step.

In any case, the magnification value at which the fluid to be treated will be concentrated can be increased gradually by repeating the ice crystal generation step described previously and the ice crystal separation step described previously.

The loss rate caused by the wastes can also be reduced to less than 0.5% by weight when it is expressed in terms of the sold content quantity.

It may be appreciated from the above description that the concentrated fluid to be treated may include the starting material milk (milk element) without any limitations to the starting material milk as long as it contains the milk component. Separately from the term that is expressed as the starting material milk, the examples of the milk elements may include raw milk, skimmed milk, fermented milk (fermented milk, drink yogurt and the like in liquid forms), lactic acid beverage, whey, buttermilk and the concentrated liquids thereof (membrane concentrated liquids and the like). The concentrated fluids that are manufactured by using those milk elements in accordance with one embodiment of the present invention may include the concentrated products (freeze-concentrated milk foods) such as the concentrated milk, the concentrated skimmed milk, the concentrated fermented milk (the concentrated fermented milk, concentrated drink yogurt and the like in liquid forms), the concentrated lactic acid beverage, the concentrated whey, the concentrated buttermilk and the like and the concentrated products (freeze-concentrated milk foods) thereof.

From one aspect of the present invention in which the fluids to be treated can retain or improve the good physical property, quality, flavor and the like possessed inherently by the starting material milk (milk element), the preferred fluids to be treated may include raw milk, skimmed milk, fermented milk (such as the fermented milk, drink yogurt and the like in liquid forms), lactic acid beverage and buttermilk.

From another aspect of the present invention in which the fluids to be treated can improve the number of live bacteria of the useful microorganisms (lactic acid, bifidus bacteria, yeast and the like) that exist in the starting material milk (milk element), the preferred fluids to be treated may include fermented milk (such as the fermented milk, drink yogurt and the like in liquid forms) and lactic acid beverage. From a further aspect of the present invention in that the fluids to be treated can improve the storage (frozen storage) of the starting material milk (milk elements), the preferred fluids to be treated may include raw milk, skimmed milk, buttermilk (in which case, the butter serum may be include in the concept of the buttermilk). From still another aspect of the present invention in which the fluids to be provide the improved effects, the more preferred fluids to be treated may include a buttermilk.

The freeze-concentration method (such as the suspension crystal deposition method (or the suspension crystallizing method)) in accordance with one embodiment of the present invention is not limited to any of the specific methods described as the prior art methods so far herein. Any of the prior art methods can be used in conjunction with the present invention, and can be combined with the methods of the present invention.

Among others, the freeze-concentration method of the present invention may be combined with the method of deoxidizing the fluid to be treated (such as the milk elements). By this combination, it is expected that the freeze-concentration method can provide the fluids to be treated (such as the freeze-concentrated milk elements) that can be stored (frozen) for a long time without the flavor or taste being affected or altered by the deoxidizing method. Any of the deoxidizing methods that can reduce the concentration of the oxygen solved in the fluid to be treated can be used with the present invention without any limitations to those methods. Without any particular limitations, the gas replacement method using any inert gages such as nitrogen and the like, the reduced pressure degassing method using the vacuum degassing apparatus, the membrane deoxidizing method using the hollow membrane and the like may be mentioned as the examples thereof.

When any one or ones of the milk elements are used as the fluid to be treated, the concentrated products (such as the freeze-concentrated milk foods) to be manufactured in accordance with one embodiment of the present invention may be used in the same way or manner as the conventional concentrated products (such as the reduced pressure heated milk foods). As noted in this case, the freeze-concentrated buttermilk, for example, can control or prevent any oxidizing or light deteriorating effects from occurring. Thus, it is strongly expected that the present invention will be able to provide the effective freeze-concentration method.

When any one or ones of the milk elements are used as the concentrated products to be treated, the concentrated products (such as the freeze-concentrated milk foods) to be manufactured in accordance with one embodiment of the present invention can retain the fragrance component (the highly volatilizable fragrance component such as acetone, 2-butanone and the like) that is substantially equal to preferably more than three times, more preferably more than five times, much more preferably more than seven times and most preferably more than nine times as compared with the conventional concentrated products (the reduced pressure heated milk products). When any one or ones of the milk elements, such as preferably raw milk, skimmed milk, buttermilk and more preferably buttermilk are used as the concentrated products to be treated, the concentrated products (freeze-concentrated milk foods) manufactured in accordance with the present invention can retain the fragrance component that is substantially equal to preferably more than 0.7 times, more preferably more than 0.8 times, much more preferably more than 0.9 times and most preferably more than one times, as compared with the products that have not been treated in accordance with the present invention.

When any one or ones of the milk elements such as the fermented milk (the fermented milk, drink yogurt and the like in liquid forms) are used as the fluid to be treated, on the other hand, the concentrated products (freeze-concentrated milk foods) to be manufactured in accordance with one embodiment of the present invention can retain the number of live bacteria contained in the useful microorganisms (such as lactic acid, bifidus, yeast and like bacteria) that is substantially equal to preferably more than 0.7 times, more preferably more than 0.8 times, much more preferably more than nine times and most preferably more than one times as compared with the products that have not been treated in accordance with one embodiment of the present invention. Additionally, when any one or ones of the milk elements such as the fermented milk (such as the fermented milk, drink yogurt and the like in liquid forms) are used as the fluid to be treated, the concentrated products (freeze-concentrated milk foods) to be manufactured in accordance with one embodiment of the present invention can retain the number of live bacteria contained in the useful microorganisms (such as lactic acid, bifidus, yeast and like bacteria) that is substantially equal to preferably more than $5\times10^6$ cfu/g, more preferably more than $5\times10^7$ cfu/g, much more preferably more than $5\times10^7$ cfu/g, and most preferably more than $5\times10^8$ cfu/g as compared with the products that have not been treated in accordance with the present invention.

FIG. 2 is a schematic diagram illustrating one example of the freeze-concentration apparatus designed for use in manufacturing the concentrated products (in which the operations are usually performed in accordance with the production method of the present invention) wherein the apparatus includes the process of preparing the membrane concentrated fluid to be treated as described previously, the process of forming a mixed fluid composed of the previously described concentrated fluid to be treated for which the concentrated fluid to be treated has been further concentrated and the ice crystal, and the process of separating thus formed mixed fluid into the concentrated fluid to be treated and the ice crystal from which the concentrated fluid to be treated can be retrieved, the processes mentioned above being performed on the batch basis.

The apparatus illustrated as its typical example in FIG. 2 is arranged such that the concentrated fluid (such as the starting material milk, for example) may initially be subjected to the membrane concentration process using the reverse osmosis membrane (RO membrane) at the predetermined low temperature (0 to 20° C.). For example, the fluid to be treated whose solid content concentration is equal to 9% by weight can be concentrated by 15% by weight.

Subsequent to the above processes, the fluid to be treated may be sterilized by means of any known sterilizer, after which it may be transferred to the concentration process in which the freeze-concentration method is performed.

For the concentration process using the freeze-concentration method, the freeze-concentration apparatus shown as its typical example in FIG. 2 may be used.

The freeze-concentration apparatus illustrated in FIG. 2 includes a crystal generation tank (jacket-attached tank) that has the internal diameter of 50 cm, the height of 70 cm, the coil-type stirring blades and the capacity of 140 kg, for example) into which a fluid to be treated (the membrane-concentrated starting material milk that has been concentrated during the membrane-concentration process such as the one described previously, for example) and a stationary separation container (stationary separation tank). The crystal generation tank and the stationary separation container (stationary separation tank) are connected with each other by way of a transport pump (not shown) through which the mixed fluid may be transported from the crystal generation tank to the stationary separation container (stationary separation tank).

The crystal generation tank shown in FIG. 2 has a jacket attached thereto into which any suitable refrigerant (such as ammonia, glycol and the like) may be fed from the freezer. There is also a cooling means that is provided for allowing the refrigerant to circulate through the crystal generation tank.

As the refrigerant that is fed from the freezer is flowing through the jacket or as the cooling means causes the refrigerant to circulate through the crystal generation tank and then flow through the stirring blades, the fluid to be treated (such as the membrane-concentrated starting material milk and the like) within the crystal generation tank will be cooled indirectly so that an ice crystal for the fluid to be treated (such as the membrane-concentrated starting material milk and the like) can be generated in the fluid to be treated (such as the membrane-concentrated starting material milk and the like). The generation of the ice crystal causes a mixed fluid to be generated, the mixed fluid being composed of the concentrated fluid to be treated for which the concentrated fluid to be treated (such as the membrane-concentrated starting material milk and the like) has been further concentrated and the ice crystal.

More specifically, the mixed fluid is delivered into the stationary separation container (the stationary separation tank) through the transport pump. Said mixed fluid is composed of said ice crystals and a concentrated fluid to be treated produced from said membrane-concentrated fluid by generating said ice crystals in said membrane-concentrated fluid thereby said membrane-concentrated fluid is concentrated. And then, the mixed fluid is placed on the stationary mode into the container where the mixed fluid is separated into the ice crystals and the concentrated fluid to be treated (the concentrated liquid) and from which the concentrated fluid to be treated (concentrated liquid) is then retrieved. The ice crystals thus separated are dissolved or fused by the warm water and the like, from which the separated water will result and will then be discharged from the freeze-concentration apparatus.

It may be appreciated from the above description that separately from the freeze-concentration apparatus illustrated and described by referring to FIG. 1, the membrane concentrated fluid adjusting step and the ice crystal generation step followed by the ice crystal separation step may also be performed on the batch basis.

EMBODIMENTS

The following description presents several preferred embodiments of the present invention in which the production method for concentrated products using the freeze-concentration method of the present invention is described by referring to the freeze-concentration apparatus having the general arrangement shown in FIG. 1 and FIG. 2 and which includes the sequence of the membrane-concentration apparatus and the freeze-concentration apparatus. It should be understood, however, that the present invention is not limited to those preferred embodiments which have been described so far and those preferred embodiments that will be described below. Rather, the present invention may be modified in various and numerous ways without departing from the spirit and scope of the invention as defined in the appended claims.

Embodiment 1

100 kg of raw milk (the starting material milk containing the solid content concentration equal to 12.3% by weight) was used as a fluid to be treated. This raw milk was maintained to be 10° C. and was membrane-concentrated by using the reverse osmosis membrane (RO membrane). The membrane-concentrated fluid to be treated (which was concentrated by about 1.8 times the starting material milk and had its solid content concentration equal to above 22% by weight) resulted from the membrane-concentration. This membrane-concentrated fluid to be treated was then placed into the crystal generation tank (the jacket-attached tank) having the internal diameter of 20 cm, the height of 100 cm, the gate shaped stirring blades used and the capacity of 140 kg).

The refrigerant that was controllably adjusted to −6 to −8° C. was delivered to the jacket-attached tank by means of the commercially available cooler so that it can be circulated through the jacket where the stirring and cooling operation was started (the stirring speed of 150 rpm).

After the elapse of five (5) hours, it was confirmed for the fluid to be treated that the concentrated milk had the temperature of −1.9° C., its solid content concentration was equal to 32% by weight and the ice crystal concentration was equal to 30% by weight.

Then, the circulation was begun so that the fluid to be treated was transferred from the crystal generation tank to the crystal separation column (where the separating filter used had the size of 100 μm) (the flow rate was 0.5 liters/s).

The ice crystal, which was separated in the crystal separation column, was then discharged, and that part of the concentrated milk which was passed through the crystal separation column was totally returned to the crystal generation tank. During this operation, the membrane-concentrated fluid to be treated (which was concentrated by about two (2) times the starting material milk and had its solid content concentration of about 24% by weight) was additionally added to the crystal generation tank so continuously that the concentrated milk could have the weight substantially equivalent to that of that part of the ice crystal which was passed through the crystal separation column.

After the operation was continued for 30 hours, it was found that the concentrated milk (the concentrated products) that had been obtained continuously had the temperature of −1.9° C. and its solid content concentration of 32% by weight. It was also found that that part of the ice crystal which was then discharged only contained the solid content of 0.3 kg, which means that that part of the milk solid content which was not recovered back to the concentrated milk was only 0.3% by weight of the total.

In this embodiment, it has been described that the processing steps proceed in the continuous manner along the path through the individual blocks shown in FIG. 1. As its variation, the processing steps may also proceed on the batch basis along the path through the individual blocks shown in FIG. 2.

Embodiment 2

100 kg of buttermilk (the starting material milk containing the solid content concentration equal to 10.6% by weight) was used as a fluid to be treated. This buttermilk was maintained to be 10° C. and was membrane-concentrated by using the reverse osmosis membrane (RO membrane). The membrane-concentrated fluid to be treated (which was concentrated by about 1.7 times the starting material milk and had its solid content concentration equal to above 18% by weight) resulted from the membrane-concentration. This membrane-concentrated fluid to be treated was then placed into the crystal generation tank (the jacket-attached tank) having the internal diameter of 20 cm, the height of 100 cm, the gate shaped stirring blades used and the capacity of 140 kg).

The refrigerant that was controllably adjusted to −6 to −8° C. was delivered to the jacket-attached tank by means of the commercially available cooler so that it can be circulated through the jacket where the stirring and cooling operation was started (the stirring speed of 150 rpm).

After the elapse of five (5) hours, it was confirmed for the fluid to be treated that the concentrated buttermilk had the temperature of −1.9° C., its solid content concentration was equal to 32% by weight and the ice crystal concentration was equal to 30% by weight.

Then, the circulation was begun so that the fluid to be treated was transferred from the crystal generation tank to the crystal separation column (where the separating filter used had the size of 100 μm) (the flow rate was 0.5 liters/s).

The ice crystal, which was separated in the crystal separation column, was then discharged, and that part of the concentrated buttermilk which was passed through the crystal separation column was totally returned to the crystal generation tank. During this operation, the membrane-concentrated fluid to be treated (which was further concentrated by about two (2) times the starting material milk and had its solid content concentration of about 21% by weight) was additionally added to the crystal generation tank so continuously that the concentrated milk could have the weight substantially equivalent to that of that part of the ice crystal which was passed through the crystal separation column.

After the operation was continued for 30 hours, it was found that the concentrated buttermilk (concentrated products) that had been obtained continuously had the temperature of −1.9° C. and the solid content concentration of 32% by weight. It was also found that that part of the ice crystal which was then discharged only contained the solid content of 0.2 kg, which means that that part of the buttermilk solid content which was not recovered back to the concentrated buttermilk was only 0.2% by weight of the total.

In this embodiment, it has been described that the processing steps proceed in the continuous manner along the path through the individual blocks shown in FIG. 1. As its variation, the processing steps may also proceed on the batch basis along the path through the individual blocks shown in FIG. 2.

Embodiment 3

100 kg of skimmed milk (the starting material milk containing the solid content concentration equal to 9.0% by weight) was used as a fluid to be treated. This skimmed milk was maintained to be about 10° C. and was membrane concentrated by using the reverse osmosis membrane (RO membrane) from which a membrane-concentrated fluid to be treated (which was further concentrated by about 1.8 times the stating material milk with the solid content concentration of about 16% by weight) was obtained. Then, this membrane-concentrated fluid to be treated was placed into the crystal generation tank (jacket-attached tank) (the internal diameter of 20 cm, the height of 100 cm, the gate-shaped stirring blades used and the capacity of 140 kg).

The refrigerant that was controllably adjusted to −6 to −8° C. was delivered to the jacket-attached tank by means of the commercially available cooler so that it can be circulated through the jacket where the stirring and cooling operation was started (the stirring speed of 150 rpm).

After the elapse of five (5) hours, it was confirmed for the fluid to be treated that the concentrated skimmed milk had the temperature of −1.9° C., its solid content concentration was equal to 36% by weight and the ice crystal concentration was equal to 30% by weight.

Then, the circulation was begun so that the fluid to be treated was transferred from the crystal generation tank to the crystal separation column (where the separating filter used had the size of 100 μm) (the flow rate was 0.5 liters/s).

The ice crystal, which was separated in the crystal separation column, was then discharged, and that part of the concentrated skimmed milk which was passed through the crystal separation column was totally returned to the crystal generation tank. During this operation, the membrane-concentrated fluid to be treated (which was further concentrated by about two (2) times the starting material milk and had its solid content concentration of about 18% by weight) was additionally added to the crystal generation tank so continuously that the concentrated fluid to be treated could have the weight substantially equivalent to that of that part of the ice crystal which was passed through the crystal separation column.

After the operation was continued for 30 hours, it was found that the concentrated skimmed milk (the concentrated products) with its solid content concentration of 36% by weight and having the temperature of −1.9° C. could be obtained continuously. The ice crystal that had been discharged at this moment only contained the milk solid content of 0.5% by weight of the total, which means that that part of the milk solid content which was not recovered back to the concentrated milk was only equal to 0.5% by weight.

In this embodiment, it has been described that the processing steps proceed in the continuous manner along the path through the individual blocks shown in FIG. 1. As its variation, the processing steps may also proceed on the batch basis along the path through the individual blocks shown in FIG. 2.

Embodiment 4

The following describes the case in which the operation is preformed on the batch basis along the pass through the individual blocks shown in FIG. 2.

100 kg of skimmed milk (the starting material milk having the solid concentration of 9.0% by weight) was used as a fluid to be treated. This skimmed milk was maintained to be 10° C. and was membrane concentrated by using the reverse osmosis membrane (the RO membrane, the operating pressure of 0.8 to 4 MPa, the passed liquid discharge of 4 to 14 kg/m²/h), from which a membrane-concentrated fluid to be treated (which was further concentrated by about 1.7 times the starting material milk with its solid content concentration of about 15% by weight) was obtained. Then, this membrane-concentrated fluid to be treated was placed into the crystal generation tank (jacket-attached tank) (the internal diameter of 50 cm, the height of 70 cm, the coil type stirring blades used, and the capacity of 140 kg).

The refrigerant that was controllably adjusted to −6 to −8° C. was delivered to the jacket-attached tank by means of the commercially available cooler (not shown) so that it can be circulated through the jacket where the stirring and cooling operation was started (the stirring speed of 57 rpm).

After the elapse of five (5) hours, it was confirmed for the fluid to be treated that the concentrated skimmed milk had the temperature of −1.2° C., its solid content concentration was equal to 23% by weight and the ice crystal concentration was equal to 37% by weight.

The fluid to be treated, over which the ice crystal had been dispersed, was retrieved from the jacket-attached tank, which was then transported from the jacket-attached tank to the stationary separation container (the stationary separation tank) where the ice crystal was separated as it remained to be stationary. After the elapse of about fifteen (15) minutes, it was found that the milk solid content in the ice crystal had the concentration equal to 0.1% by weight.

In this embodiment, the processing steps proceed on the batch basis along the path through the individual blocks shown in FIG. 2. As its variation, the processing steps may also proceed continuously along the path through the individual blocks shown in FIG. 1.

If it is desired that the jacket-attached tank should be cooled, any suitable cooling means may be provided within the jacket-attached tank so that the refrigerant can be circulated not only through the jacket but also through the coil type stirring blades. It has been confirmed that this will reduce the time required for concentrating the ice crystal and the desired concentration degree can be attained within such reduced time.

(Comparison Case 1)

For the purpose of the comparison, 100 kg of raw milk (the starting material milk containing the solid content concentration of 12.3% by weight) was used as a fluid to be treated. This raw milk was placed into the crystal generation tank (jacket-attached tank) (the internal diameter of 20 cm, the height of 100 cm, the gate shaped stirring blades and the capacity of 140 kg).

The refrigerant that was controllably adjusted to −6 to −8° C. was delivered to the jacket-attached tank by means of the commercially available cooler so that it can be circulated through the jacket where the stirring and cooling operation was started (the stirring speed of 150 rpm).

After the elapse of five (5) hours, it was confirmed that the concentrated milk, which was used as the fluid to be treated, had the temperature of −0.4° C., its solid content concentration was substantially equal to 15% by weight and the ice crystal concentration was substantially equal to 30% by weight.

Following this, the circulation was begun so that it could flow from the crystal generation tank through the crystal separation device (where the separation filter of 100 μm was used) (the flow rate of 0.5 liters/s).

The ice crystal, which was separated through the separation device in the crystal separation column, was then discharged, and that part of the concentrated milk which was passed through the crystal separation column was totally returned to the crystal generation tank. During this operation, the raw milk or the fluid to be treated (starting material milk having its solid concentration of 12.3% by weight) was additionally added to the crystal generation tank so continuously that the concentrated fluid to be treated could have the weight substantially equivalent to that of that part of the ice crystal which was separated through the separation filter and was then discharged.

After this operation was continued for forty (40) hours, it was found that the resulting concentrated milk (concentrated products) obtained continuously during this operation had its solid content concentration of 32% by weight and the temperature of −1.9° C.

The invention claimed is:

1. A method for producing a concentrated product using a membrane-concentration method and a freeze-concentration method, which comprises:
   a membrane-concentration step in which a fluid to be treated is cooled and a membrane-concentrated fluid is prepared by membrane-concentrating a solid content concentration of the fluid to be treated by more than 1.5 times by using any one of a reverse osmosis membrane, a nano filtration membrane, an ultrafiltration membrane and a precision filtration membrane;
   an ice crystal generation step in which said membrane-concentrated fluid is cooled, ice crystals of said membrane-concentrated fluid are generated in said membrane-concentrated fluid, and a mixed fluid to be treated is formed wherein said mixed fluid to be treated is comprised of said ice crystals and a concentrated fluid to be treated produced from said membrane-concentrated fluid by generating said ice crystals in said membrane-concentrated fluid thereby said membrane-concentrated fluid is concentrated; and
   an ice crystal separation step in which said mixed fluid is separated into said concentrated fluid to be treated and said ice crystals, and said separated concentrated fluid to be treated is retrieved,
   wherein said ice crystal generation step and said ice crystal separation step following said ice crystal generation step are repeated a second time or subsequent time for said concentrated fluid to be treated that has been retrieved during said ice crystal separation step,
   wherein said ice crystal generation step following the second and subsequent time is performed for fresh fluid to be treated, the fresh fluid to be treated being obtained by additionally adding said membrane-concentrated fluid prepared by said membrane-concentration step having a capacity equivalent to that of said ice crystals that have been separated during said immediately preceding ice crystal separation step to said concentrated fluid to be treated that has been retrieved during said immediately preceding ice crystal separation step.

2. The method for producing a concentrated product using a membrane-concentration method and a freeze-concentration method as defined in claim 1, wherein said step of preparing said membrane-concentrated fluid, forming said mixed fluid composed of said ice crystals and said concentrated fluid to be treated produced from said membrane-concentrated fluid by further concentrating said concentrated fluid produced from said membrane-concentrated fluid, and said step of separating said mixed fluid into said concentrated fluid to be treated and said ice crystals and retrieving said concentrated fluid to be treated are performed on a batch basis.

3. The method for producing a concentrated product using a membrane-concentration method and a freeze-concentration method as defined in claim 1, wherein said fluid to be treated is any one of raw milk, skimmed milk, fermented milk, lactic acid beverage, whey, and buttermilk.

4. The method for producing a concentrated product using a membrane-concentration method and a freeze-concentration method as defined in claim 1, wherein as compared with the fluid to be treated, the concentrated product contains more than 70% of a fragrance component compared with an amount of the fragrance component in a product that has not been treated.

5. The method for producing a concentrated product using a membrane-concentration method and a freeze-concentration method as defined in claim 1, wherein as compared with the fluid to be treated, the concentrated product contains more than 70% of live bacteria of useful microorganism compared with a number of live bacteria of useful microorganisms in a product that has not been treated.

6. The method for producing a concentrated product using a membrane-concentration method and a freeze-concentration method as defined in claim 3, wherein the fermented milk comprises a fermented milk in a liquid form or drink yogurt.

* * * * *